Oct. 23, 1928.
R. BJORKLUND
VALVE GRINDER
Filed July 12, 1927
1,689,105
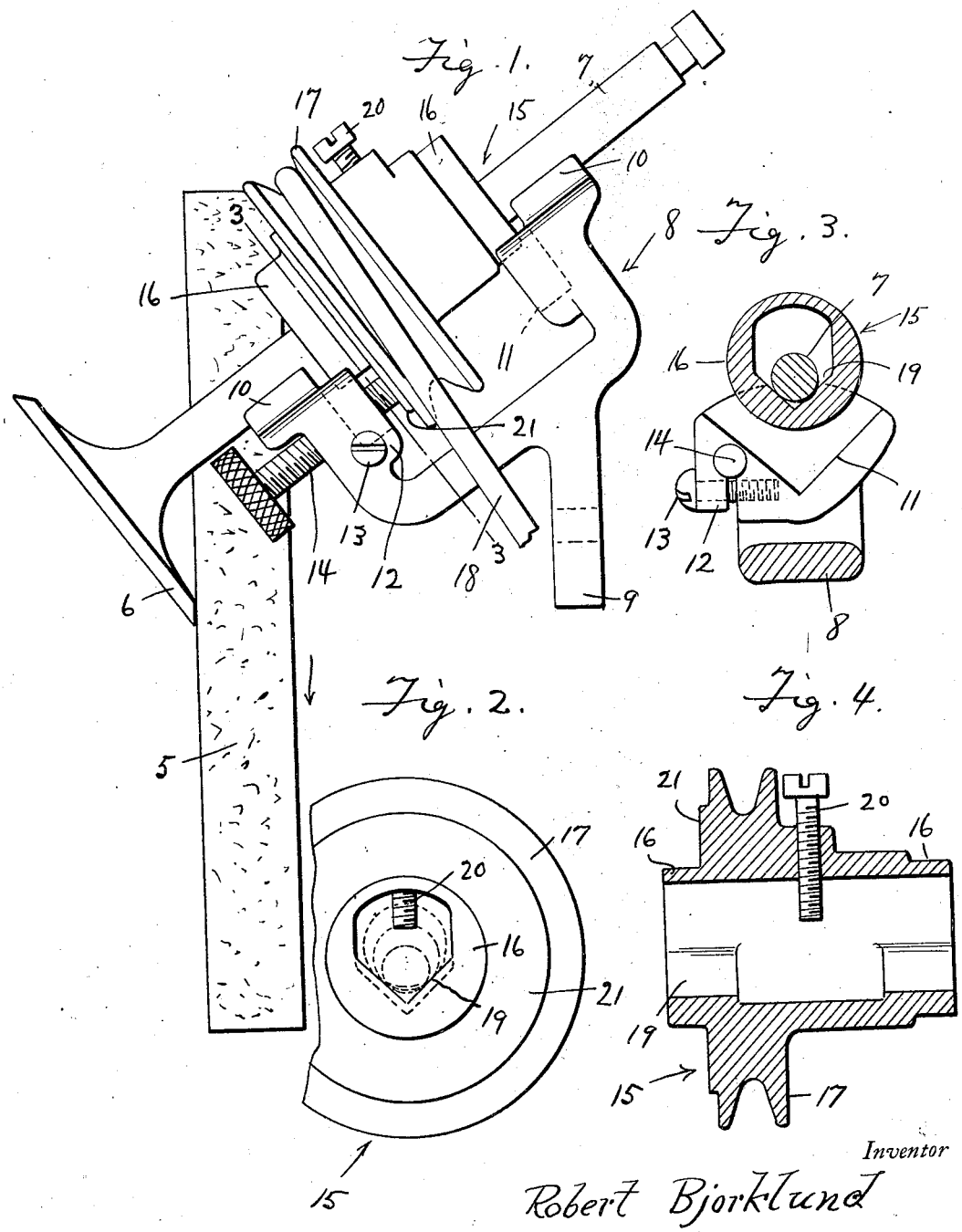
Inventor
Robert Bjorklund
By Clarence A. O'Brien
Attorney Patented Oct. 23, 1928.

1,689,105

UNITED STATES PATENT OFFICE.

ROBERT BJORKLUND, OF BROOKLYN, NEW YORK.

VALVE GRINDER.

Application filed July 12, 1927. Serial No. 205,146.

The invention embodied in this application relates to what is believed to be a new type of valve grinder, the same having more particular reference to a structure of this class which is expressly intended for resurfacing the bevelled periphery of the head on an engine valve of the mushroom type.

More specifically the invention has reference to a device for supporting and rotating a valve in substantially diagonal relationship to a refacing abrading stone.

The alleged features of novelty relied upon will become more readily apparent from the following description and drawings.

In the drawings:

Figure 1 is a side elevation of the improved device showing the valve located in operative position with respect to the abrading stone.

Figure 2 is an end elevation of an especially constructed pulley forming an important part of the device.

Figure 3 is a section taken approximately upon the plane of the line 3—3 of Figure 1, looking in a direction from right to left.

Figure 4 is a longitudinal section through the pulley.

In the drawings, the reference character 5 designates the abrading element or stone, which may be of any suitable construction, 6 designates the head of the valve and 7 the stem.

One of the principal parts of the device is an especially constructed bracket generally designated by the reference character 8. This comprises an attaching lug 9 adapted for perpendicular position in spaced parallelism to the abrading element 5. Obviously, it is intended to be rigidly fastened to a bench or suitable stationary support. On the upper end of this lug is a substantially U-shaped yoke, the upper ends of the arms of which are built to provide a pair of substantially V-shaped bearings 10, for reception of the valve stem 7. In addition these portions of the arm are thickened inwardly and provided with relatively deep and large V-shaped seats 11. Moreover, one of the arms is provided, as shown in Figure 3, with a yieldable extension 12, through which a clamping bolt 13 is threaded. This extension 12 is fashioned to provide a screw threaded hole for a set screw 14. Incidentally the inner end of this screw is perfectly flat and it has two important functions as will be later described.

The remaining part of the invention comprises an especially constructed pulley generally designated by the reference character 15. The pulley comprises a single body having tubular end extensions 16 and an intermediate thickened portion provided with an outstanding flange 17 grooved to provide for reception of a flexible driving belt 18. On its interior and adjacent its ends, the pulley is formed with V-shaped pockets 19, and the valve stem 7 is intended to be seated in these and held in place by a restraining screw 20. I also wish to mention the flat surface 21 on the flange 17, which is adapted to rest rotatably against the smooth inner end of the aforesaid set screw 14. In this connection I would state that the set screw operates as an abutment in this respect and has the additional function of an adjusting screw for bodily shifting the pulley and valve to bring the bevelled edge of the head of the valve into contact with the abrading stone.

In practice, the valve stem, which may be of any reasonable diameter as indicated in dotted lines in Figure 2, is fastened in the V-shaped pockets 19 of the pulley by way of the retaining screw 20. Then the pulley and valve as a unit are placed in position on the yoke. Obviously the stem 7 is arranged in the bearings 10, at which time the cylindrical end portions 16 of the pulley are raised up out of the V-shaped seats 11, as indicated in Figure 3. The pulley and valve are allowed to slide down into engagement with the inner end of the abutment screw 14. The abutment screw is then adjusted to bring the valve head into contact with the abrading element. The belt 18 is driven from any suitable source of power (not shown) and it will be noted that it is preferably arranged to exert a downward pressure on the pulley to insure firm running contact of the surface 21 with the abutment screw 14. If properly adjusted the screw 14 is locked in place by way of the small bolt 13 (see Figure 3). With the device thus set, the pulley is rotated to reface the valve head in an obvious manner. When the valve is removed by loosening the screw 20, the end portions 16 of the pulley will be dropped down into the seats 11 to prevent displacement of the pulley and to keep it in readiness for the next operation.

By considering the description in connection with the drawings, a clear understanding of the invention and advantages will be had, and therefore a more lengthy description is thought unnecessary.

Minor changes coming within the field of invention claimed may be restorted to, if desired.

I claim:

A valve grinder of the class described comprising a pulley including a tubular hub portion terminating in cylindrical end portions and having an internal V-shaped valve stem receiving pockets, said body also including an outstanding grooved flange formed on one side with a circular bearing surface spaced inwardly from the adjacent end of the hub, a set screw carried by the hub, and a supporting bracket for said pulley, said supporting bracket embodying an attaching lug adapted to be fixedly mounted on a support, and a yoke, the arms of which are provided with V-shaped seats for reception of the end portions of said hub, and outwardly spaced V-shaped valve stem bearings, said seats being of a depth greater than said bearings, and an adjustable abutment screw carried by one of the yoke arms and engaging said bearing surface.

In testimony whereof I affix my signature.

ROBERT BJORKLUND.